Feb. 11, 1936.  P. J. KROLL  2,030,174
VEHICLE ROCKING MACHINE
Filed July 11, 1934   2 Sheets-Sheet 1

Inventor
P. J. KROLL
By
C. L. Parker Jr.
Attorney

Feb. 11, 1936.  P. J. KROLL  2,030,174
VEHICLE ROCKING MACHINE
Filed July 11, 1934  2 Sheets-Sheet 2
Fig. 3.
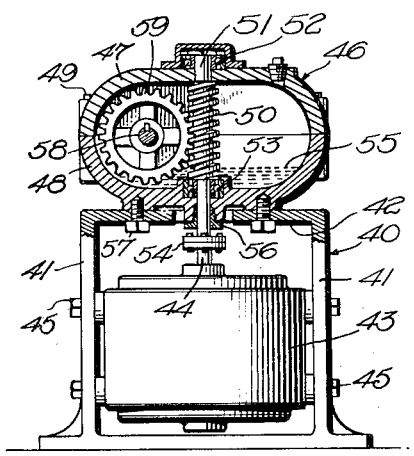
Fig. 4.
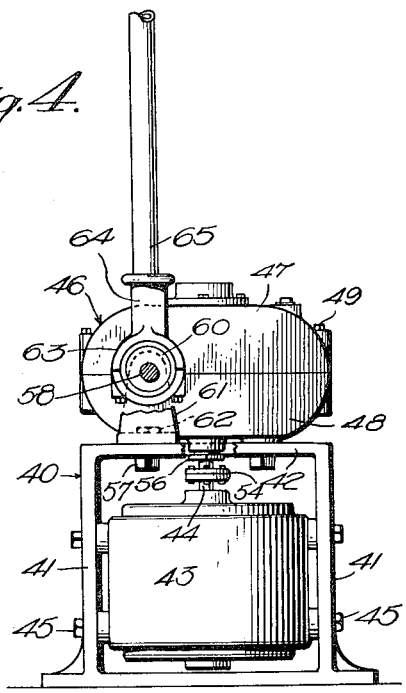
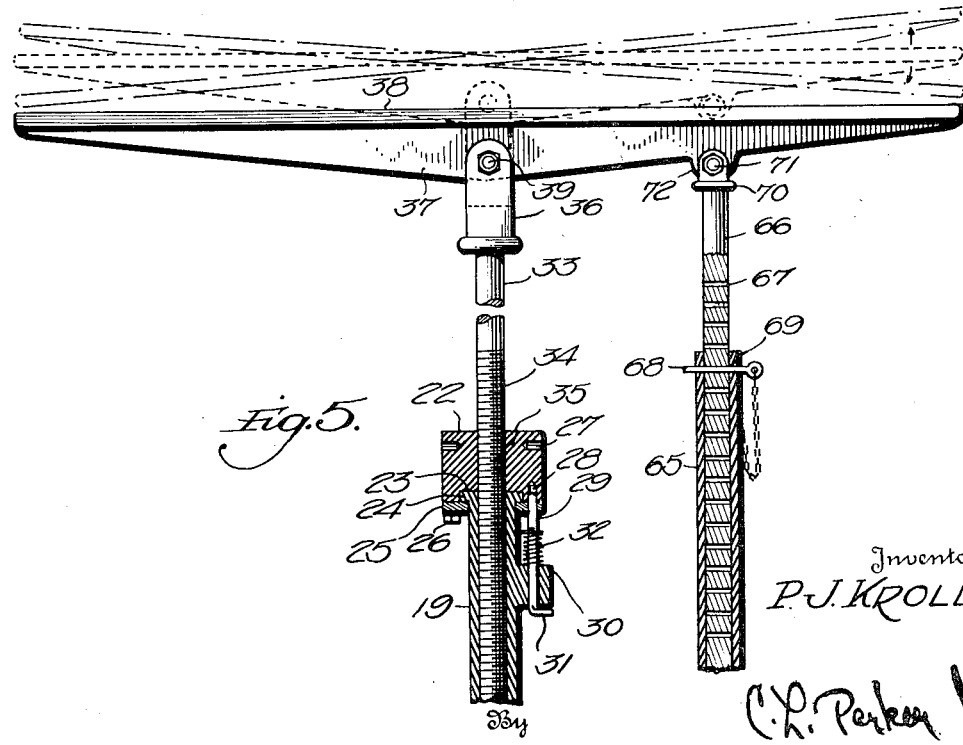
Fig. 5.
Inventor
P. J. KROLL
By C. L. Parker Jr.
Attorney Patented Feb. 11, 1936

2,030,174

UNITED STATES PATENT OFFICE 2,030,174

VEHICLE ROCKING MACHINE

Philip J. Kroll, Tulsa, Okla.

Application July 11, 1934, Serial No. 734,666

8 Claims. (Cl. 73—51)

This invention relates to lubricating apparatus, and more particularly to an apparatus adapted for use in conjunction with the lubricating devices employed for lubricating motor vehicles in service stations.

As is well known, motor vehicle service stations are equipped with pressure lubricating devices having flexible hoses adapted for connection with the lubricating fittings of motor vehicles whereby lubricant may be supplied under pressure to such parts of the motor vehicle as the shackle bolts. Moreover, it is the common practice to spray the leaves of the vehicle springs with lubricants to reduce the surface friction between the spring leaves. The types of lubricating apparatus referred to, however, are employed while the vehicle is at rest over a greasing pit or on a vehicle lift, and in either case, the entire weight of the vehicle is supported on the vehicle wheels. Accordingly there is substantial pressure between the parts to be lubricated, thus rendering it difficult for the lubricant to force its way between all of the coacting bearing surfaces.

In the case of the vehicle shackle bolts, the weight of the vehicle causes the shackle bolts and their bushings to engage each other under the greatest pressure at the points where lubricant is mostly needed, and the use of the usual grease guns accordingly is sometimes ineffective for properly lubricating the shackle bolts. In the case of the vehicle springs, it will be obvious that the weight of the vehicle holds the springs flexed with the leaves thereof in tight engagement with each other. This condition interferes with the free flow of lubricant between the leaf springs.

An important object of the present invention is to provide novel and easily operated means for supporting the weight of the vehicle body independently of the running gear while the parts of the vehicle are being lubricated, thus permitting the free flow of lubricant to the desired points.

A further object is to provide an apparatus of the character referred to which is operative for rocking the vehicle, thus causing the parts to be lubricated to partake of constant relative movement to assist in the proper distribution of the lubricant.

A further object is to provide an apparatus which is operative for supporting the weight of the vehicle independently of the running gear and which is operative for rocking the vehicle body while thus supported whereby the lubricant is free to move to the points where it is most greatly needed, and wherein such movement of the lubricant is assisted by the relative movement of the parts being lubricated.

A further object is to provide an extremely simple form of apparatus including a single locking member having means associated therewith for effecting upward movement thereof to support the vehicle body and having additional simple means connected thereto for effecting rocking movement of the vehicle body.

Other objects and advantages of the invention will become apparent during the course of the following description.

In the drawings I have shown one embodiment of the invention. In this showing:

Figure 3 is an enlarged detail vertical sectional view of the driving motor and associated parts taken on line 3—3 of Figure 2, Figure 4 is an enlarged side elevation of the same, and, Figure 5 is an enlarged sectional view on line 5—5 of Figure 1, parts being shown in elevation.

Figure 1:
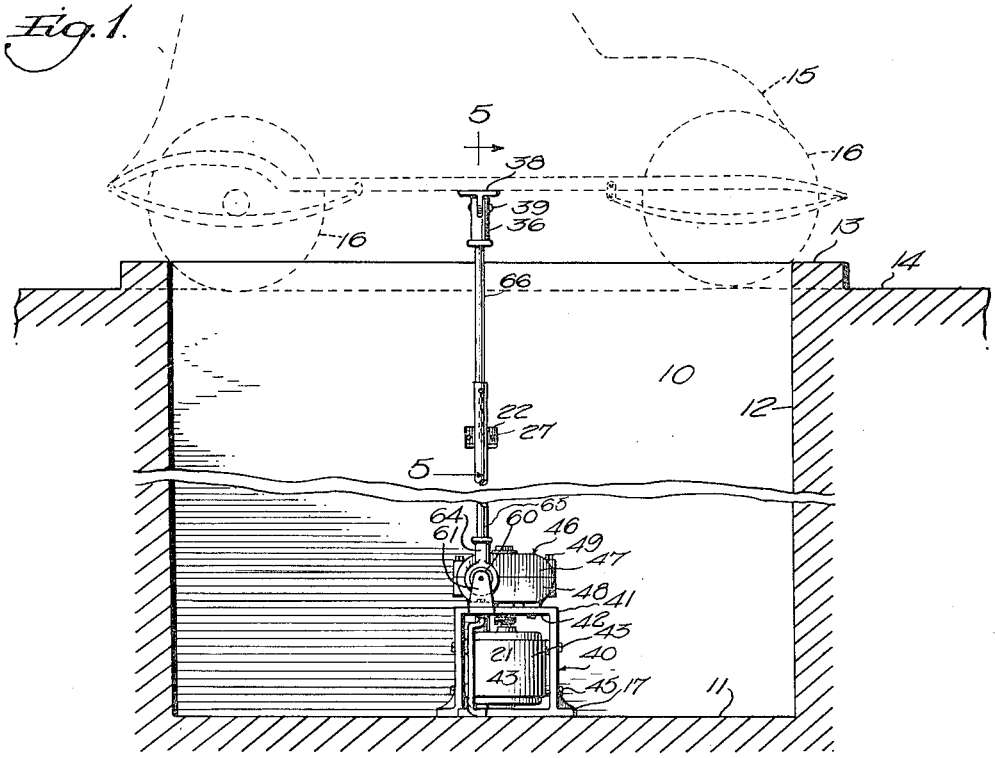
Figure 1 is a vertical longitudinal sectional view of a service station grease pit showing the apparatus in position thereon.

Referring to the drawings, the numeral 10 designates a grease pit of the type commonly employed in motor vehicle service stations, the pit having a floor 11 and side walls 12. The upper ends of the side walls project upwardly as at 13 above the surrounding surface of the ground 14 to act as a guard in the usual manner and to define a runway for the vehicle wheels, as shown in dotted lines in Figure 2. A vehicle 15 is indicated in dotted lines as being in position over the pit with the wheels 16 thereof straddling the pit.

Figure 2:
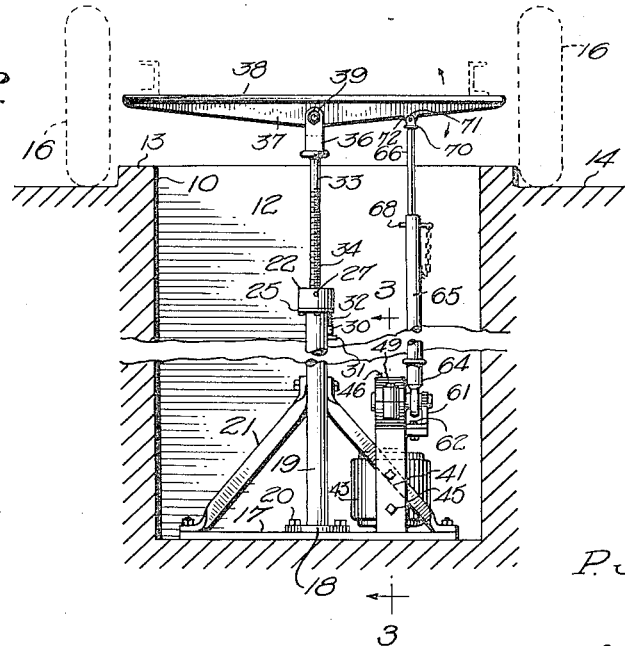
Figure 2 is a transverse vertical sectional view of the same.

The apparatus forming the subject matter of the present invention comprises a base member 17 to which is secured the lower flange 18 of a vertically extending tubular support 19, suitable bolts or screws 20 being employed for securing the flange 18 to the base. The tubular support is indicated in Figure 2 as being braced on opposite sides as at 21, laterally with respect to the grease pit, for a purpose to be described. It will be apparent that any suitable number of the braces 21 may be employed.

Referring to Figure 5, it will be noted that a collar 22 is arranged at the upper end of the support 19. This collar may be provided in its lower end with an annular recess 23 receiving an annular flange 24 formed at the upper end of the support 19. A plate 25 may be secured below the base of the collar 22 as at 26, to retain the flange 24 in the recess 23. While the structure just described is preferred, it will become apparent that no mechanical connection is necessary between the collar 22 and support 19, it being practical merely to permit the collar 22 to rest upon the upper end of the support 19 or upon the upper face of the flange 24. The collar 22 is provided with radial openings 27 for the reception of suitable rods by means of which the collar may be rotated, although it will be obvious that any other suitable means may be employed for this purpose, such as a spanner wrench.

The lower face of the collar 22 outwardly of the flange 24, may be provided with one or more vertical openings 28 to receive the upper end of a latch 29. This latch is slidable in an arm 30 projecting laterally from and connected to the support 19, and the lower end of the latch may be bent to form a handle 31. A spring 32 normally urges the latch 29 upwardly, and it will be apparent that when the upper end of the latch is arranged in the opening 28, rotation of the collar 22 is prevented.

A jack shaft 33 has its lower end 34 threaded for engagement in a threaded axial opening 35 extending through the collar 22. The lower end of the jack shaft is slidable in the tubular support 19 and accordingly is free to move vertically with respect thereto upon rotation of the collar 22. The upper end of the jack shaft is secured to a yoke 36 having upstanding arms straddling a depending longitudinal rib 37 carried by a rocker 38. The arms of the yoke are pivotally connected to the rib 37 by a suitable bolt 39.

A supporting frame indicated as a whole by the numeral 40 is carried by the base 17 and includes a pair of spaced parallel vertical arms 41 connected at their upper ends as at 42. A motor 43 is mounted between the arms 41 with its armature shaft 44 extending vertically, and the motor is secured to the arms 41 by suitable screws 45. It is preferred that the motor be vertically arranged in the interest of compactness, and it will be apparent that the invention is not limited to the specific structure shown and the motor may be arranged in any desired position. It also will become apparent that the invention is not in any sense limited to the specific power means employed, and any known type of power means such as steam, compressed air or the like may be employed.

A gear housing indicated as a whole by the numeral 46 is arranged above the frame 40 and includes upper and lower complementary sections 47 and 48 secured together by screws or bolts 49. A worm 50 extends vertically through the housing 46 and is carried by a shaft 51. This shaft is journaled at its upper end in a bearing 52 carried by the housing section 47, and is journaled adjacent its lower end in a similar bearing 53 carried by the lower housing section 48. The shaft 51 extends through the lower housing section 48 and is coupled as at 54 to the armature shaft 44 of the motor. The housing 46 contains a body of lubricant 55, and in order to prevent the loss of lubricant from the housing, the lower end of the shaft 51 preferably extends through a suitable gland 56 carried by the lower housing section 48. The gear housing may be secured in any suitable manner to the frame 40, and as shown in Figure 3, screws 57 extend through the horizontal portion 42 of the frame and are threaded in suitable bosses carried by the housing section 48.

A transverse shaft 58 extends through the gear housing and is provided with a worm wheel 59 meshing with the worm 50. The shaft 58 may be suitably journaled in opposite sides of the gear housing 46, and one end of the shaft 58 projects a substantial distance beyond the housing 46 and carries an eccentric cam 60. The shaft 58 may extend beyond the cam 60 to be supported in the upper end of a bearing bracket 61 secured at its lower end as at 62 to the top frame member 42.

A bearing collar 63 surrounds the cam 60 and is provided with a vertical extension 64 in which is secured the lower end of a tubular member 65. Referring to Figure 5, it will be noted that a vertical rod 66 is slidable in the upper end portion of the tubular member 65 and is provided with a plurality of relatively closely spaced transverse openings 67. These openings are adapted to selectively receive a pin 68 mounted in alined openings 69 extending through the tubular member 65. The upper end of the rod 66 carries a yoke 70 pivotally connected as at 71 to the rib 37 or to a depending projection 72 carried thereby.

The operation of the apparatus is as follows:

Assuming that the rocker 38 is arranged in a lowered position substantially in contact with the upper edges 13 of the walls of the grease pit, a motor vehicle may be driven into a position over the pit as indicated in dotted lines in Figures 1 and 2. The pin 68 is removed from the openings 67 and 69, and this pin may be connected to a chain as indicated in Figure 5 to prevent its displacement. With the pin 68 removed, it will be apparent that the rod 66 is free for vertical sliding movement with respect to the tubular member 65. The rod 29 is released from the opening 28 and held in released position while the collar 22 is rotated by means of a suitable tool. Assuming that the threads 34 are right hand threads, the collar 22 will be rotated in a clockwise direction looking downwardly thereon. Rotation of the collar 22 effects relative axial movement between the jack shaft 33 and collar 22, and since the latter element is prevented from moving downwardly by the tubular support 19, it will be obvious that the jack shaft is caused to move upwardly. The ends of the rocker 38 are thus brought into engagement with the side rails of the vehicle frame, as indicated in Figure 2, and rotation of the collar 22 is continued to move the rocker 38 and the vehicle body upwardly to relieve the running gear of the weight of the body and chassis. When the vehicle body and chassis have been elevated to a sufficient extent, the latch 29 is released, and the collar 22 is rotated until the upper end of the latch snaps into the opening 28, whereupon the collar 22 is fixed against rotation.

The pin 68 is then inserted through the openings 69 and through the nearest opening 67, whereupon the apparatus is ready for operation. The motor 43 is then started in operation and the shaft 44 drives the shaft 51 and power will be transmitted to the shaft 58 by the worm 50 and worm wheel 59. Rotation of the shaft 58 drives the cam 60, and since this cam is eccentric to the shaft 58, reciprocating movement will be transmitted to the tubular member 65. It will be apparent that the pin 68 fixes the tubular member 65 and rod 66 against relative movement, and the members 65 and 66 constitute a pitman connection between the cam 60 and rocker 38. The rocker 38 is pivotally supported on the upper end of the jack shaft, and the vertical movement of the pitman connection referred to obviously transmits a constant rocking motion to the rocker 38. Thus this member not only supports the weight of the body and chassis of the vehicle but transmits a rocking motion thereto, and during such rocking motion, the usual grease guns or similar apparatus may be employed for lubricating the shackle bolts of the vehicle. The usual spraying means also may be employed for spraying lubricant on the vehicle springs. Since the weight of the chassis and body are relieved from the shackle bolts, the lubricant is permitted to flow more freely between the shackle bolts and their bushings, and the same is true of the vehicle spring leaves. The movement of the lubricant to the various bearing surfaces is greatly assisted by the constant rocking motion imparted to the vehicle body during the lubricating operation.

After the parts referred to have been lubricated, the motor 43 is stopped and the pin 68 is removed whereupon the latch 29 is held in disengaged position while the collar 22 is rotated in the reverse direction to lower the rocker 38 to its normal position substantially in contact with the upper ends of the walls of the pit. The vehicle is then free to be driven from its position over the pit, as will be apparent.

It will be obvious from the foregoing description that the apparatus is relatively simple in construction and is capable of quick and convenient operation. The rotation of the collar 22 to elevate the vehicle body and chassis may be accomplished in a short space of time, and the same is true of the lowering of the rocker back to normal position. The elevation of the vehicle body and chassis in itself greatly assists in the initial lubrication of the vehicle parts referred to, and the efficiency of the lubricating operation is greatly increased by the constant rocking motion transmitted to the chassis by the rocker 38. The braces 21 serve to brace the tubular support 19 and jack shaft during the rocking operation. The only lateral forces transmitted to the jack shaft occur in the vertical plane of the rocker 38 during the rocking motion, and for this reason the braces 21 are arranged transversely of the pit 10, or in the plane of the rocker 38. However, it will be apparent that additional braces may be employed, if desired. It also will be apparent, as previously stated, that any suitable power means may be employed in place of the electric motor 43.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:

1. Apparatus of the character described comprising an elongated rocker adapted for arrangement beneath a motor vehicle and engageable against the bottom of the side frame members of the vehicle transversely thereof, a jack shaft pivotally connected at its upper end to said rocker substantially centrally of the length thereof, means for effecting vertical movement of said jack shaft to elevate the vehicle body, and means for oscillating said rocker about its pivotal connection with said jack shaft.

2. Apparatus of the character described comprising an elongated rocker adapted for arrangement beneath a motor vehicle and engageable against the bottom of the side frame members of the vehicle transversely thereof, a jack shaft pivotally connected at its upper end to said rocker substantially centrally of the length thereof, means for effecting vertical movement of said jack shaft to elevate the vehicle body, a pitman connected at one end to said rocker adjacent one end of the latter, and means connected to the other end of said pitman for transmitting a rocking motion to said rocker.

3. Apparatus of the character described comprising an elongated rocker adapted for arrangement beneath a motor vehicle and engageable against the bottom of the side frame members of the vehicle transversely thereof, a jack shaft pivotally connected at its upper end to said rocker substantially centrally of the length thereof, means for effecting vertical movement of said jack shaft to elevate the vehicle body, a pitman connected at one end to said rocker adjacent one end of the latter, a rotatable shaft, and eccentric means connected between said shaft and the other end of said pitman for transmitting a rocking motion to said rocker.

4. Apparatus of the character described comprising an elongated rocker adapted for arrangement beneath a motor vehicle and engageable against the bottom of the side frame members of the vehicle transversely thereof, a jack shaft pivotally connected at its upper end to said rocker substantially centrally of the length thereof, means for effecting vertical movement of said jack shaft to elevate the vehicle body, a rod, a tubular member slidably receiving said rod, means for connecting said rod and said tubular member against relative movement, whereby said rod and said tubular member constitute a pitman, means for connecting one end of said pitman to said rocker adjacent one end thereof, and means connected to the other end of said pitman for transmitting a rocking motion to said rocker.

5. Apparatus of the character described comprising an elongated rocker adapted for arrangement beneath a motor vehicle and engageable against the bottom of the side frame members of the vehicle transversely thereof, a jack shaft pivotally connected at its upper end to said rocker substantially centrally of the length thereof, means for effecting vertical movement of said jack shaft to elevate the vehicle body, a rod, a tubular member slidably receiving said rod, means for connecting said rod and said tubular member against relative movement, whereby said rod and said tubular member constitute a pitman, means for connecting one end of said pitman to said rocker adjacent one end thereof, a rotatable shaft, and eccentric means connecting said shaft to the other end of said pitman for transmitting a rocking motion to said rocker.

6. Apparatus of the character described comprising an elongated rocker adapted for arrangement beneath a motor vehicle and engageable against the bottom of the side frame members of the vehicle transversely thereof, a jack shaft pivotally connected at its upper end to said rocker substantially centrally of the length thereof, a vertical tubular support slidably receiving the lower end of said jack shaft, a rotatable member carried by said support and having threaded connection with said jack shaft, a pitman comprising a pair of telescoping sections, means for securing said sections against relative longitudinal movement, one end of said pitman being connected to said rocker adjacent one end thereof, and means connected to the other end of said pitman for transmitting a rocking motion to said rocker.

7. Apparatus of the character described comprising an elongated rocker adapted for arrangement beneath a motor vehicle and engageable against the bottom of the side frame members of the vehicle transversely thereof, a jack shaft pivotally connected at its upper end to said rocker substantially centrally of the length thereof, a vertical tubular support slidably receiving the lower end of said jack shaft, a rotatable member carried by said support and having threaded connection with said jack shaft, a pitman comprising a pair of telescoping sections, means for securing said sections against relative longitudinal movement, one end of said pitman being connected to said rocker adjacent one end thereof, a rotatable shaft, and eccentric means connected between said shaft to the other end of said pitman for transmitting a rocking motion to said rocker.

8. Apparatus of the character described comprising an elongated rocker adapted for arrangement beneath a motor vehicle and engageable against the bottom of the side frame members of the vehicle transversely thereof, a jack shaft pivotally connected at its upper end to said rocker substantially centrally of the length thereof, a vertical tubular support slidably receiving the lower end of said jack shaft, a rotatable member carried by said support and having threaded connection with said jack shaft, a pitman comprising a pair of telescoping sections, means for securing said sections against relative longitudinal movement, one end of said pitman being connected to said rocker adjacent one end thereof, a rotatable shaft, a worm wheel carried by said shaft, a worm meshing with said worm wheel, a motor driving said worm, and eccentric means connecting said shaft to the other end of said pitman for transmitting a rocking motion to said rocker.

PHILIP J. KROLL.